US006522943B2

(12) United States Patent
Dierauer

(10) Patent No.: US 6,522,943 B2
(45) Date of Patent: Feb. 18, 2003

(54) EVENT DRIVEN MULTICAST MATERIAL SORTING SYSTEM

(75) Inventor: Peter Dierauer, Freeport, IL (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/910,300

(22) Filed: Jul. 20, 2001

(65) Prior Publication Data

US 2002/0045969 A1 Apr. 18, 2002

Related U.S. Application Data

(63) Continuation-in-part of application No. 09/219,164, filed on Dec. 22, 1998, now abandoned.

(51) Int. Cl.[7] .................................................. G06F 7/00
(52) U.S. Cl. .................. 700/223; 700/224; 198/349.95
(58) Field of Search ................................ 700/223, 224; 198/370.02, 349, 349.95, 460.1; 209/583, 577, 656, 657

(56) References Cited

U.S. PATENT DOCUMENTS

| | | | | |
|---|---|---|---|---|
| 3,786,939 A | | 1/1974 | Habegger et al. | |
| 4,227,607 A | * | 10/1980 | Malavenda | 198/460.1 |
| 4,832,204 A | | 5/1989 | Handy et al. | |
| 4,884,696 A | | 12/1989 | Peleg | |
| 5,299,134 A | | 3/1994 | Speckhart et al. | |
| 5,469,150 A | | 11/1995 | Sitte | |
| 5,887,699 A | * | 3/1999 | Tharpe | 198/367 |
| 6,076,683 A | * | 6/2000 | Okada et al. | 209/577 |

FOREIGN PATENT DOCUMENTS

| | | |
|---|---|---|
| EP | 380 211 | 8/1990 |

* cited by examiner

*Primary Examiner*—Christopher P. Ellis
*Assistant Examiner*—Gene O Crawford
(74) *Attorney, Agent, or Firm*—Roland W. Norris; Andrew A. Abeyta

(57) ABSTRACT

A method and apparatus for sorting units of material includes a transport media formed in a plurality of segments. A plurality of actuators and at least one of an identification sensor, a segment sensor, a length sensor are connected with respect to the transport media. A parameter of a unit of material is sensed to generate a data update and calculate control outputs in a sort logic controller. The control outputs are sent from the sort logic controller to a network controller for the sensors and actuators. The network controller is synchronized to the output of the sort logic controller to receive and read the outputs, which are written together to the network memory, as soon as they are written from the sort logic controller. The output signal based upon the data update is then immediately multicast through the network to at least one actuator and the units of material are sorted based upon the output signal.

35 Claims, 5 Drawing Sheets

Synchronized

To1 = To2 = To1'= To2'

To1 = time to deliver Output 1 first cycle
To2 = time to deliver Output 2 first cycle
To1' = time to deliver Output 1 2cd. cycle
To2' = time to deliver Output 2 2cd. cycle

Synchronized

To1 = To2 = To1' = To2'

To1 = time to deliver Output 1 first cycle
To2 = time to deliver Output 2 first cycle To1' = time to deliver Output 1 2cd. cycle
To2' = time to deliver Output 2 2cd. cycle

EVENT DRIVEN MULTICAST MATERIAL SORTING SYSTEM

This application is a Continuation-In-Part of U.S. Application Ser. No. 09/219,164 filed Dec. 22, 1998 now ABN.

BACKGROUND OF THE INVENTION

1. Field of the Invention

This invention relates to a networked material sorting system for sortation of units of material.

2. Description of Related Art

Industrial networks for high-speed handling of material are used in applications such as mail handling, parcel distribution, warehouse distribution and airport baggage distribution. Such industrial networks rely upon accurate and time efficient handling using transport media such as conveyor belts for moving the material through the handling process. Sensors and actuators are variously used to generate a signal and execute an appropriate handling action based upon such signal.

Prior industrial networks use a time segmented approach to organize and rule the media access of the industrial network. Such industrial networks utilize technology known as master-slave principle, token passing or time multiplex. The result of such technology is that prior industrial networks exchange information in cycles. A signal from a sensor or actuator is only reported at a particular interval within the cycle. Therefore, if a sensor or actuator changes condition, the new condition cannot be reported until an entire cycle is completed. This results in variation of media access time for input signals from actuators and sensors.

Another common problem with prior industrial networks is that multiple actuators and/or sensors do not get network data at exactly the same time. Instead, a hierarchy within the cycle is executed and actuators and/or sensors only receive network data on an "as-needed" basis. Therefore, the accuracy of the industrial network is dependent upon how quickly all of the actuators and/or sensors can be updated.

Prior industrial networks typically contain control logic engines that are based on micro controllers that execute an execution code in a serial manner. The basic routine common in prior industrial logic controllers is to read inputs, calculate the outputs based on the latest input information and set the outputs on the end of the execution, or logic, cycle. After this, the next cycle starts with reading the inputs. Even modern high-speed controllers incorporating intermediate sub-cycles operate in this manner. Such modern high-speed controllers have main cycles which can be interrupted by smaller, faster sub-cycles that execute in a similar manner.

By way of further explanation, regular cyclical control systems such as a PLC (Programmable Logic Controller) execute their program in an endless loop which has 3 stages.

1) Read inputs

2) Calculate outputs (Executing program)

3) Write outputs

Then the controller loops back to stage 1. This leads to the following cycle pattern: . . . 1)2)3) 1)2)3) 1)2)3) 1)2)3) . . . .

The PLC tries to execute its program as fast as possible, therefore the cycle time (time required to execute 1)2)3)) depends on the program size. It is also true that this cycle time is not necessarily constant due to the fact that the program can have several different execution paths depending the programmed internal decisions driven by the particular input pattern at a given time.

In an earlier generation of sortation control systems, the inputs and the outputs were wired up directly to the main PLC, sometimes also called a micro controller or controller. In other words the micro controller read the inputs directly from the sensors/switches on the sortation line and activated the actuators for moving packages, such as valves, motor starters, etc in a direct fashion.

Over time the industry began to move to adapted networks to reduce wiring. By moving from hardwired solutions to network solutions the industry replaced a parallel data exchange system with a serial system. In practice this meant that the input/output signal conditioning card in the main controller got replaced with a network control layer having its own card of electronics including its own network controller, i.e. micro controller or PLC. The main, or sort logic, controller still reads the 1) inputs 2) executes its program and 3) writes the outputs However, the main controller does not have direct access to the inputs and outputs of the sensors anymore, but must communicate to the sortation line through the network controller, or control layer. The main controller thus reads from and writes to memory locations of the network card.

The network controller is responsible to deliver the output signals of the main controller to the different network devices, i.e. those devices on the sortation line. The network controller is also responsible to read the inputs of the network devices and place their data into the memory where the statuses can be read by the main controller. The network controller works independent of, i.e. not synchronized with, the main controller (PLC). In other words the network controller does not care if the main controller reads inputs or sets outputs. The network controller is continuously reading and writing data to and from network stations data in a serial matter. There are several different ways how a network controller in detail can realize this data exchange. In general the network controller runs in a loop as well, generally described as:

A) Read output data from memory

B1) Deliver output data to station 1 (network device)

B2) Deliver output data to station 2 (network device)

B3) Deliver output data to station 3 (network device)

Bx)

C1) Read input data from station 1 (network device)

C2) Read input data from station 2 (network device)

Cx)

D) Write input data into memory (network device) After this process the network controller loops back and starts new cycle, resulting in the pattern:

. . . A)B)C)D) A)B)C)D) A)B)C)D) A)B)C)D) . . .

Dependant on the network speed, the utilized protocol, and the number of inputs and outputs, the network cycle time can vary.

FIG. 7 shows the cycles of the main controller and the network controller in a nonsynchronized arrangement. In such a construction the delivery times for outputs (the time between main controller writing to memory and reception of signal by actuator, i.e. a network device) are not constant and can vary greatly between the time of two outputs in a single logic cycle, i.e. the difference in length between To1 and To2, and the difference in execution time between two cycles, i.e. the difference between To1 and To1' and To2 and To2'. Due to these different cycle and delivery times, as a practical matter the industry uses the following rules: the Network cycle has to be half (or faster) the time of the Controller cycle, which leads to a worst case overall system response time of 2x controller cycle time+2x network cycle time.

What is therefore needed is a way of dramatically improving the system response time and generating a situation where the output delivery time delays are constant, in order to effectively control a sorting system over a serial network.

SUMMARY OF THE INVENTION

The present invention accomplishes the above desired tasks by a technique sometimes called "synchronized logic solve and output delivery" combined with a multicasting of the output signals to the network devices. "Synchronized logic solve and output delivery" refers to the fact that the control solution output (signal) derived by the main, or sort logic, controller logic cycle is written to the network control layer and read by the network controller in a synchronized fashion, and that control solution output (signal) is delivered without delay to the network devices, so that no irregularity of cycle time is experienced in operating the network devices on the sortation line according to the present invention.

Referencing FIGS. 7 and 8, the difference between the known systems of FIG. 7 and the present invention of FIG. 8 are illustrated graphically. In the present invention, the output signals of the sort logic controller are delivered through the network control layer without delay by a multicast message, which means that instead sending single messages or outputs to each network station, or device, the network controller sends out a single message containing all the output data for the entire system, i.e. every station or device. All network stations thus receive this message at the same time thereby eliminating any time differences between To1 and To2, as seen in FIG. 8.

Further, according to the technique of synchronized logic solve and output delivery, the network controller is waiting for a signal, such as an interrupt, from the main controller directing that all outputs are to be written to the memory. While the signal is designated as an interrupt, the artisan of ordinary skill in the field of network-controlled high-speed sortation devices will appreciate that there are several different ways to implement this technique. At the interrupt the network controller delivers the outputs 48 to the network devices and continues the network cycle by reading all inputs and then waiting again for the synchronization signal, as seen in FIG. 8.

It is one object of this invention to provide a material sorting system in which a plurality of actuators, or other network devices receive a multicast message from a network logic controller.

It is another object of this invention to provide a material sorting system wherein a transport media has segments and an adjacent segment sensor for measuring the speed of the transport media.

It is another object of this invention to provide a material sorting system to multicast an output signal received from at least one of a segment sensor, an identification sensor and a length sensor to a plurality of actuators.

It is another object of this invention to provide a material sorting system having actuators capable of accurately diverting units of material at high speeds.

Several attempts to apply serial communication networks to material handling and sorting applications have been unsuccessful because of resolution and accuracy problems owing to the above discussed deficiencies.

A sort system for material handling according to one preferred embodiment of this invention comprises an In-Feed Section in which units of material are fed to a main sorting line; a Singulation Section where the units of material are identified, characterized and/or distinguished and placed on a transport media with a predetermined interval between each unit of material; and a Handling Section where the units of material are diverted to a correct divert line. The sort logic, or main, controller calculates the necessary output signals for a plurality of actuators on an event driven basis based on information provided by at least one of a length sensor, a segment sensor and an identification sensor that are each positioned with respect to the main sorting line.

The transport media, such as a conveyor belt, is segmented in physical segments. Although the logical segmentation of the transport media is paramount, physical segments of the transport media are preferably of equal size. The sort logic controller represents those segments as a logical cell in a shift register. An identification sensor for identifying and/or distinguishing units of material and a plurality of actuators are preferably positioned along fixed positions with respect to the transport media. The actuators are continuously provided with the shift register status, which indicates the physical location of the respective divert lines and/or the actuators within the material sorting system. The actuator is activated when the actuator identifies a match between the physical location of the actuator and the respective "tick" in the logical shift register.

Two principal changes are required to overcome the demands of the industrial network according to this invention. First, the time chain must be synchronized. This requires that the sort logic controller and the network controller of sensors and actuators do not have two independent rotating cycles. An event-driven architecture is required that allows transport, evaluation and generation of information based on events within the material sorting system. Second, the notification and activation of the actuators must be multicast so that all actuators which have to be fired in one system cycle react exactly at the same time. Additionally, in one preferred embodiment of this invention, each actuator should calculate an exact activation point using the actual speed of the transport media, the actual position of the unit of material and the length of the unit of material.

The actual speed of the transport media can be calculated by measuring the elapsed time between segments using a segment sensor. The measurement of transport media speed may be simplified in the preferred embodiment of this invention wherein the segments of transport media are each the same size. The segment sensor preferably multicasts the passing of a change from segment to segment so that all actuators receive notice of the change. The segment sensor can multicast either the actual speed of the media, the time between the segment changes or the event of the segment change. It is important that such multicast has the highest network priority

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
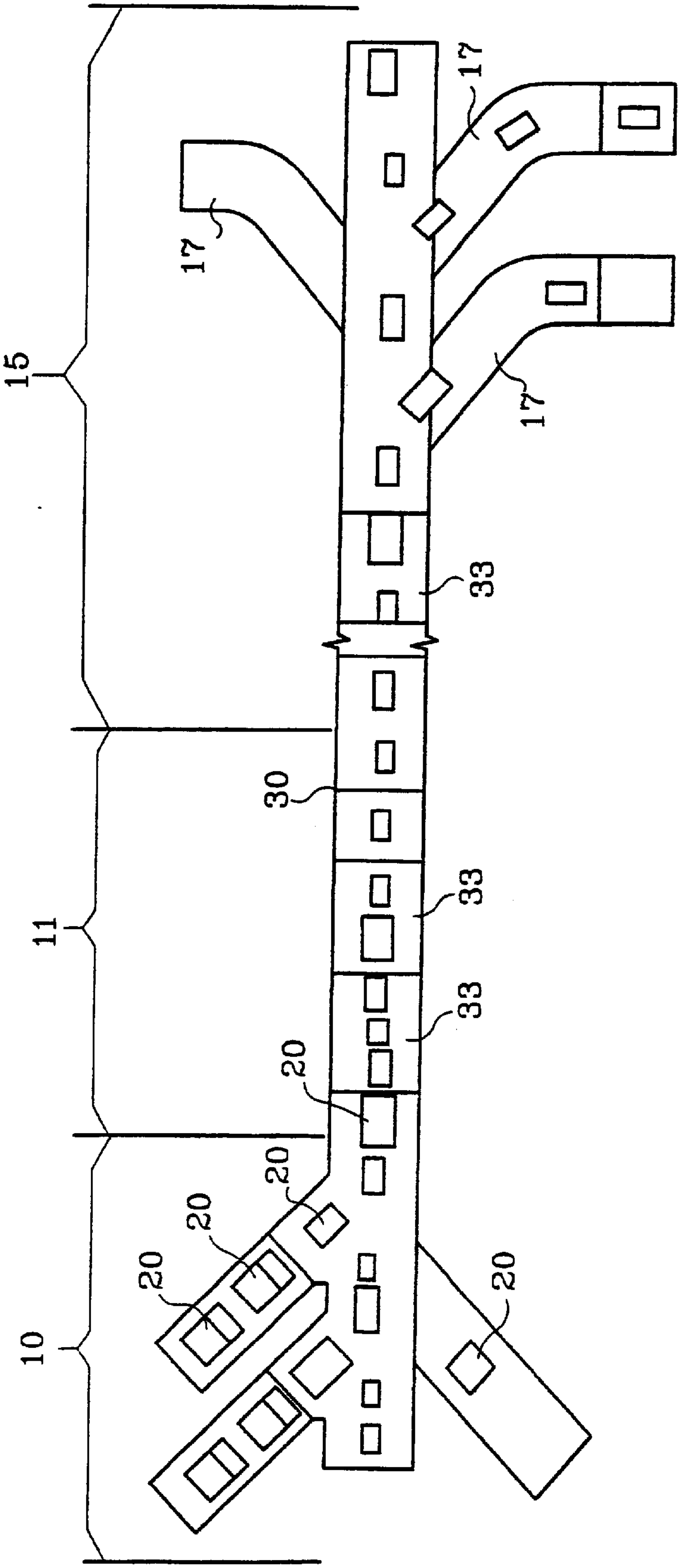
FIG. 1 is a diagrammatic top view of a material sorting system according to one preferred embodiment of this invention.
Figure 2:
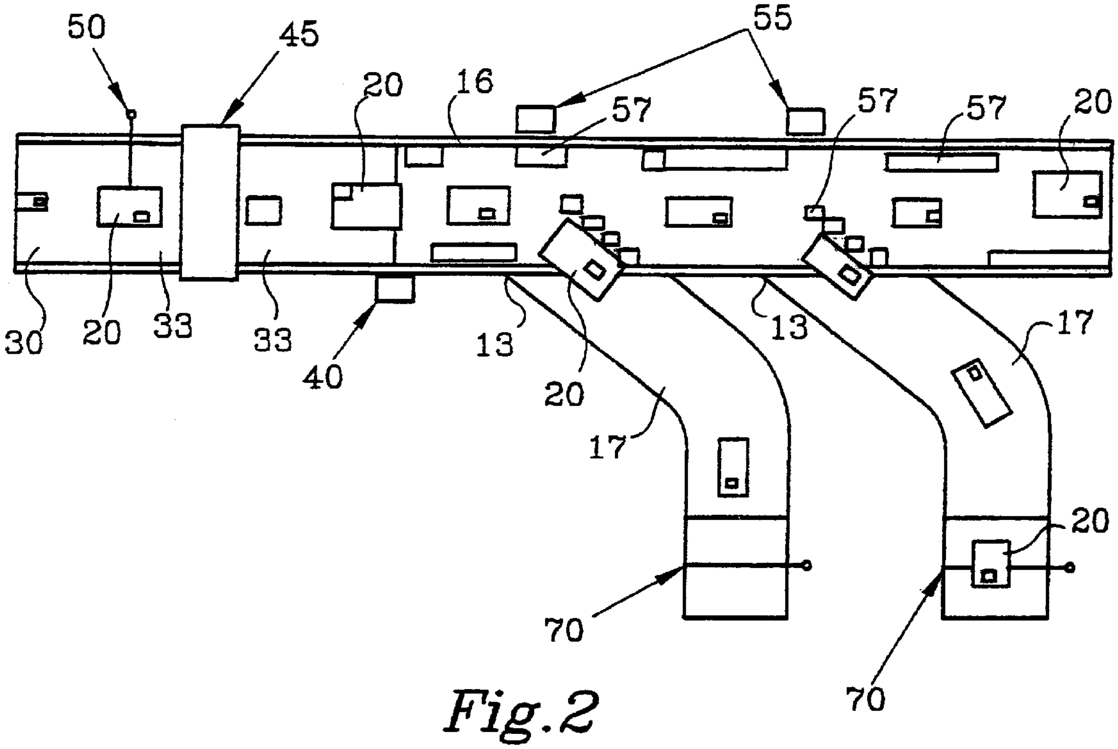
FIG. 2 is a diagrammatic top view of a material sorting system according to another preferred embodiment of this invention.

FIGS. 1 and 2 show a material sorting system for sorting a plurality of units of material according to one preferred embodiment of this invention. Such a material sorting system is particularly suitable for sortation at high speeds. As shown in FIG. 1, a sort system for material handling according to one preferred embodiment of this invention comprises In-Feed Section 10, Singulation Section 11 and Handling Section 15. Units of material 20 are fed to main sorting line 16 at the In-Feed Section 10. Singulation Section 11 is where units of material 20 are placed on transport media 30, preferably with a predetermined interval between each unit of material 20. Finally, Sortation Section 15 is where units of material 20 are diverted to an appropriate divert line 17.

Transport media 30 is preferably formed in a plurality of segments 33. Segments 33 of transport media 30 are each preferably the same length, although a logical arrangement and spacing of segments 33 is all that is required. Transport media 30 preferably comprises a conveyor belt although other transport media 30 known to those having ordinary skill in the art may also be used. Transport media 30 preferably travels at a constant speed.

In one preferred embodiment of this invention, one unit of material 20 is positioned on each one segment 33 of transport media 30. Spacing and positioning of units of material 20 along segments 33 of transport media 30 may occur using singulation techniques known by those having ordinary skill in the art.

Transport media 30 is preferably formed into main sorting line 16 and a plurality of divert lines 17 branching off from main sorting line 16. Intersections 13 are formed between each divert line 17 and main sorting line 16. Such an arrangement of divert lines 17 permits sortation of units of material 20.

Figure 3:
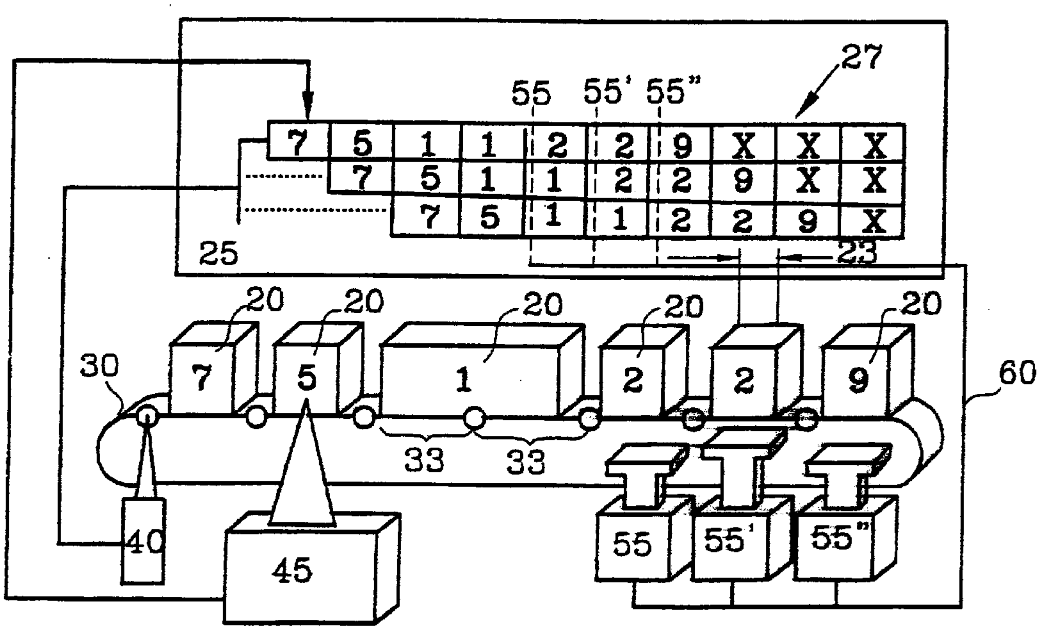
FIG. 3 is a highly simplified schematic diagram of the between the material sorting line and the main, or sort logic, controller without illustration of the network control layer.

Referring to FIG. 3, identification sensor 45 is positioned with respect to main sorting line 16. Identification sensor 45 is a scanner, RF tag or other sensor capable of distinguishing and/or identifying units of material 20. As units of material 20 pass by or through, identification sensor 45 preferably sends an identification signal through the network (not shown)to sort logic controller 25 for processing and/or multicasting.

In one preferred embodiment of this invention, segment sensor 40 is additionally positioned with respect to main sorting line 16. Segment sensor 40 may be a counter, scanner or other sensor known to those having ordinary skill in the art. Preferably, segment sensor 40 counts and/or times the passage of segments 33 of transport media 30 through main sorting line 16. Segment sensor 40 preferably sends a segment signal to sort logic controller 25 for processing and/or multicasting. Such segment signal may be the announcement of a transition or change between adjacent segments 33, the speed of segments 33 within transport media 30 or the time between changes of segments 33.

Figure 4:
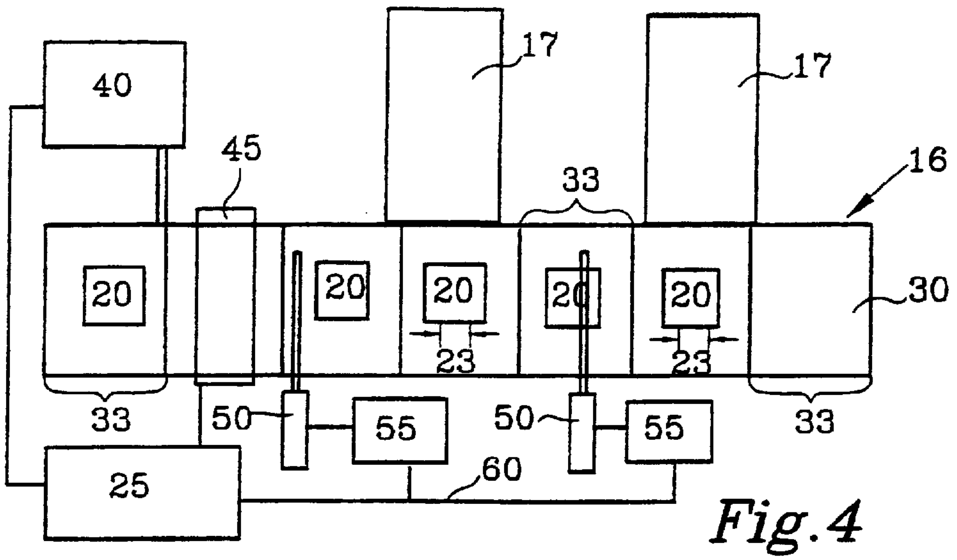
FIG. 4 is a schematic top view of a material sorting system according to yet another preferred embodiment of this invention.

In one preferred embodiment of this invention, length sensor 50 is positioned with respect to main sorting line 16. Length sensor 50 preferably measures a length or other critical dimension of unit of material 20 and sends a length signal to sort logic controller 25 for processing and/or multicasting. Alternatively, as shown in FIG. 4, length sensor 50 may send the length signal directly to actuator 55 resulting in increased accuracy for actuators 55 discussed below.

Figure 6:
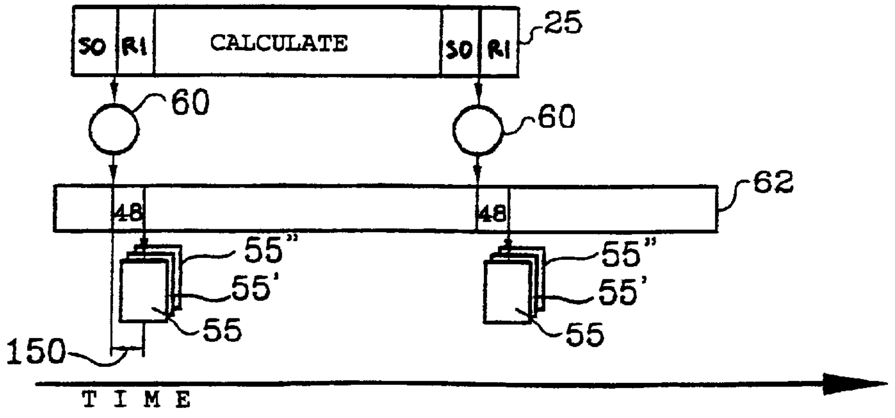
FIG. 6 is a schematic diagram of the operation of a material sorting system and illustrating a network control layer according to one preferred embodiment of this invention.

Sort logic controller 25 is preferably positioned in communication with at least one of identification sensor 45, segment sensor 40 and/or length sensor 50, i.e. network devices, through the network controller, or control layer 62 (FIG. 6). Sort logic controller 25 preferably comprises a computer or a programmable logic controller ("PLC"). Sort logic controller 25 is preferably in positioned with respect to the material sorting system to facilitate communication through the network layer between sensors 40, 45, 50 and actuators 55. Sort logic controller 25 and the network controller 62 (FIG. 6) utilize synchronized logic solve and output delivery capability which enables instant delivery of output signals based upon data updates provided from the network controller of sensors 40, 45, 50 and actuators 55. Sort logic controller 25 preferably multicasts an output signal through the network bus 60 to at least one actuator 55 of the plurality of actuators 55.

In one preferred embodiment of this invention, one or more actuators 55 are preferably individually positioned with respect to intersection 13 between main sorting line 16 and each divert line 17. Actuators 55 may comprise "smart" actuators such as actuator controls which are capable of processing and executing one or more alternative actions or simple on/off actuators which are capable only of diverting unit of material 20 from main sorting line 16. Actuators 55 may comprise pushers, swing arms, pop-up wheels, steerable wheels, shoes, actuator blocks 57 such as shown in FIG. 2, cross belts, tilt trays or any other means for diverting units of material 20 from main sorting line 16.

Sort logic controller 25 preferably includes logical shift register 27 such as schematically shown in FIG. 3. Logical shift register 27 is preferably in communication with segment sensor 40. In one preferred embodiment of this invention, logical shift register 27 is moved forward one position when transport media 30 is advanced one segment 33. As such, physical segments 33 of transport media 30 are synchronized with logical segments of logical shift register 27. Sort logic controller 25 continuously multicasts status of logical shift register 27 to actuators 55, 55', 55". As shown schematically in FIG. 3, logical shift register 27 indicates the physical location of the respective actuators 55 within the material sorting system. Actuator 55, 55', 55" is activated when actuator 55, 55', 55" identifies a match between the physical location of actuator 55, 55', 55" and the respective position in logical shift register 27.

A method for sorting units of material 20 from transport media 30 according to the apparatus described above comprises sensing at least one parameter of unit of material 20 to generate a data update. The parameter of unit of material 20 may be an interval length between units of material 20; an identification of unit of material 20; and/or a length of unit of material 20. One or more of the above described identification sensor 45, segment sensor 40 and/or length sensor 50 may be used or the respective functions of each sensor 40, 45, 50 may be combined into a single physical sensor.

Sensor 40, 45, 50 preferably sends the data update through sort logic controller 25 to a synchronized network of sensors and actuators. The network control layer 62 is not shown in FIGS. 3 and 4 for simplicity of explanation. The synchronization of the operations of the network control layer, or controller, 62 (FIG. 6) with the sort logic controller 25 according to this invention is achieved because the sort logic controller 25 and the network control layer 62 have synchronized logic solve and output delivery capability. That is, the network control layer 62 immediately accepts the control output from the sort logic controller 25 without waiting for a complete logic cycle to finish and immediately passes it to the network devices such as actuators 55 in order to increase the efficiency of the sort system. Sort logic controller 25 is programmed to convert a data update received from one or more sensors 40, 45, 50 into an output signal delivered through the network to one or more actuators 55. In addition, as discussed above, logical shift register 27 in the sort logic controller 25 shifts the network of sensors and actuators one logical segment or "tick" forward for every physical segment 33 advanced within transport media 30. Therefore the material handling system according to this invention provides an event driven data update to the network of sensors and actuators.

Referencing FIGS. 3 and 6, an output signal based upon the data update is multicast from sort logic controller 25 to at least one actuator 55. The multicast output signal is preferably delivered to each node, such as each sensor 40, 45, 50 and/or each actuator 55, within the network of sensors and actuators. Finally, in the method according to one preferred embodiment of this invention, at least one actuator 55 sorts units of material 20 based upon the output signal.

Several factors are important considerations in the material sorting system according to this invention. The size of segment 33 of the transport media 30 is preferably as small as unit of material 20 permits. As the size of segment 33 decreases, the feasible size of units of material 20 decreases as well as the size of the intervals between units of material 20.

The material sorting system according to this invention has constant time factors and variable time factors in the response time chain of the system. The system timing chain generally comprises: 1) a time that segment sensor 40 requires to detect a change in segment 33 within transport media 30; 2) a time needed to send an announcement of the change in segment 33 over a network, bus 60 or wire to sort logic controller 25; 3) a time sort logic controller 25 requires to determine which actuators 55 should be activated; 4) a time to send multicast output signal from sort logic controller 25 over a network bus 60 or wire and network control layer 62 to actuators 55; and 5) a time actuator 55 requires to activate. The minimal size of segment 33 is given by the sum of all constant and variable time factors in the worst case.

Sort logic controller 25 preferably communicates with the plurality of actuators 55 through the network bus 60. Bus 60, which may comprise a two-wire bus, four-wire bus or other suitable bus known to those having ordinary skill in the art, preferably enables sort logic controller 25 to multicast an output signal to the plurality of actuators 55 throughout the operation of the material sorting system.

Figure 5:
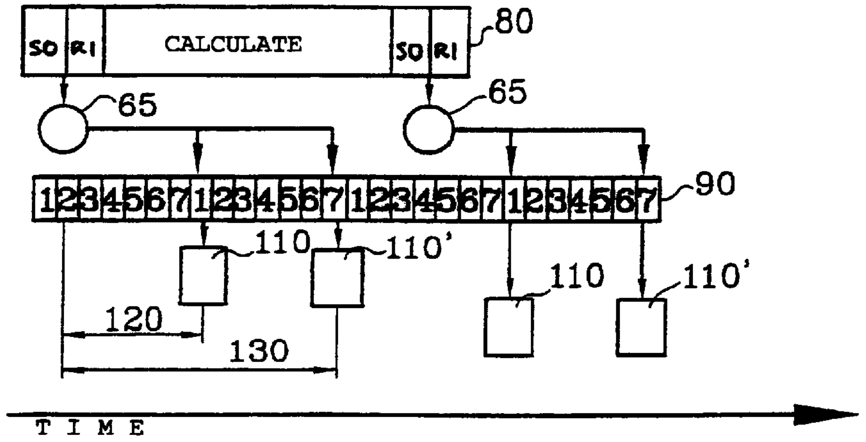
Fig. 5 (PRIOR ART)
FIG. 5 is a schematic diagram of the operation of a material sorting system according to the prior art and illustrating a network control layer.
Figure 7:
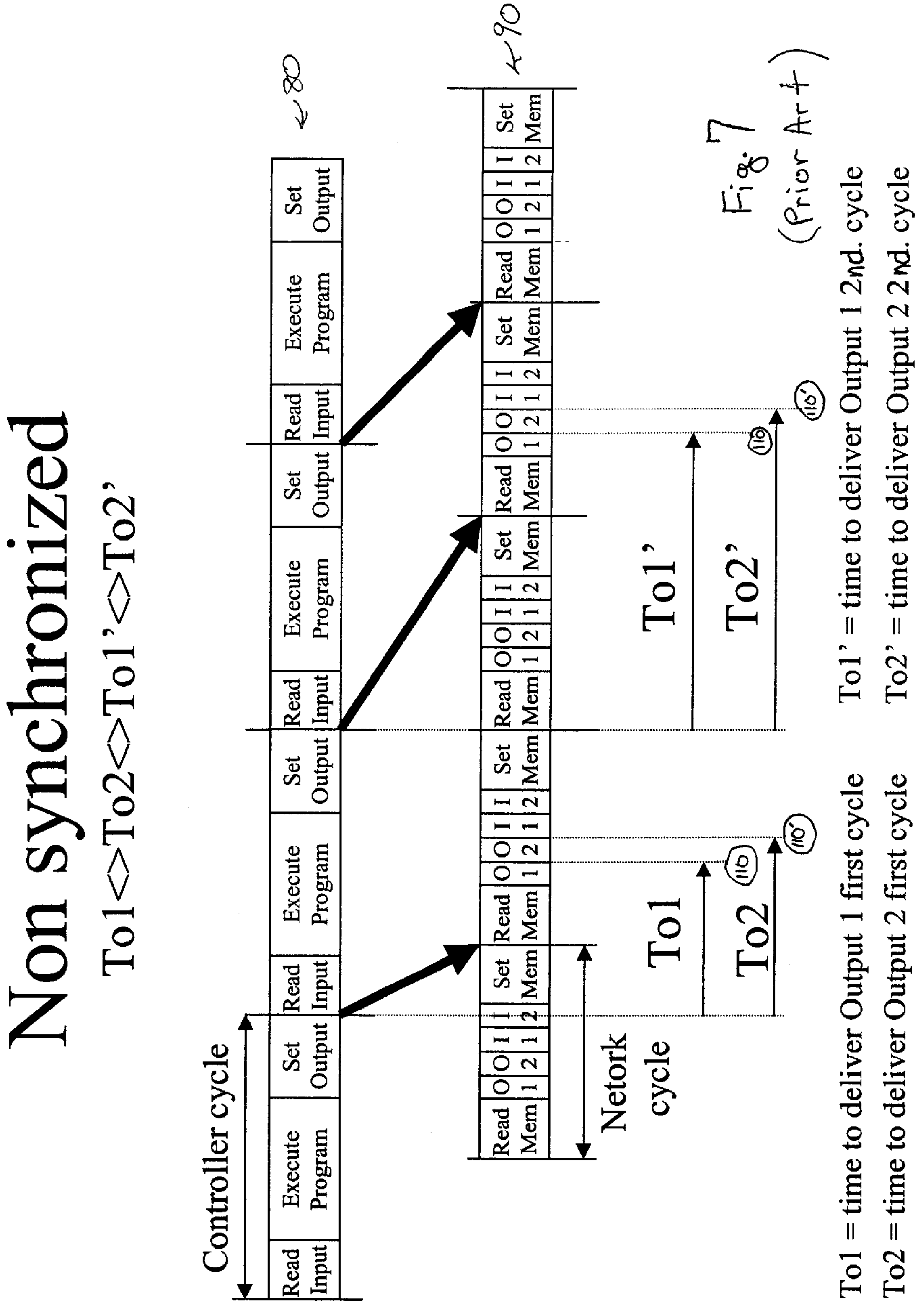
Fig. 7 (Prior Art)
FIG. 7 is a schematic diagram, similar to FIG. 5, of the operation of a material sorting system according to the prior art and illustrating an unsynchronized main control and network control layer.

FIGS. 5 and 7 show a schematic of the operation of a prior art material sorting system comprising controller 80, network 90 and actuators 110, 110'. Sensors (not shown) deliver data to controller 80 which provides the data, through data buffer 65 (FIG. 5), to network 90. Controller 80 as shown reads inputs (RI), calculates outputs and sets outputs (SO) throughout a single logic cycle. Referencing FIG. 5, each box 1–7 shown in network 90 represents a cycle during which signals are delayed to actuators 110, 110'. The minimum time delay 120 in network 90 is represented by the signal sent to actuator 110 and the maximum time delay 130 is represented by the signal sent to actuator 110'.

Figure 8:
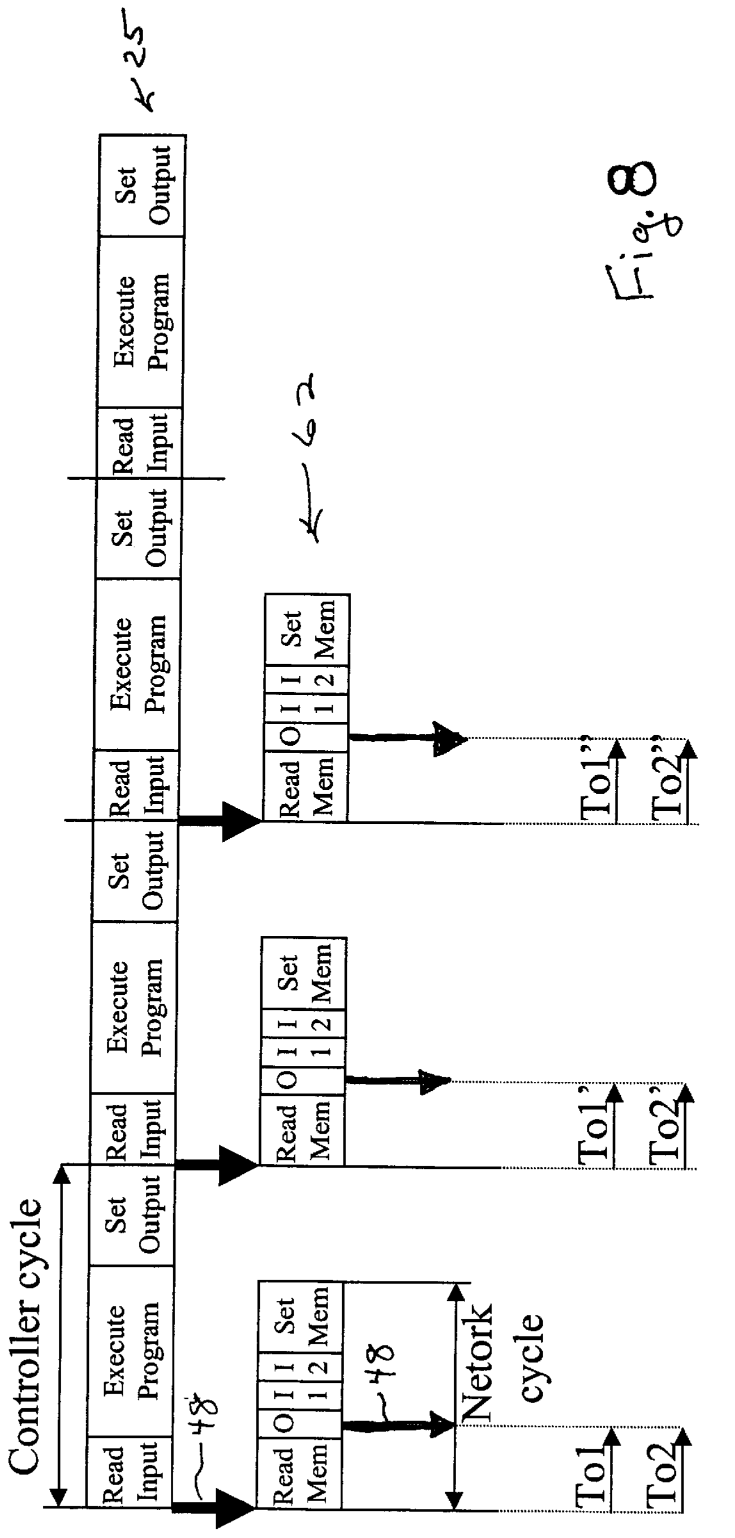
FIG. 8 is a schematic diagram, similar to FIG. 6, of the operation of a material sorting system and illustrating a network control layer according to one preferred embodiment of this invention and illustrating an synchronized main, or sort logic, control and network control layer having the synchronized logic solve and output delivery technique of the present invention.

FIGS. 6 and 8 represent material sorting systems according to preferred embodiments of this invention. Sensors 40, 45, 50 (not shown) deliver a data update to sort logic controller 25 on an event driven basis through bus 60 to the network control layer 62 of the sensors and actuators 55, 55', 55". Sort logic controller 25 reads inputs (RI), calculates outputs and sets outputs (SO) through a single logic cycle. As discussed above, sort logic controller 25 and the network control layer 62 have synchronized logic solve and output delivery functions by which the network control layer 62 immediately accepts the output from the sort logic controller 25 without waiting for a complete network logic cycle to finish and send the control signal outputs immediately to the transport media, e.g. the actuators, in order to increase the efficiency of the sort system. The resulting output signal(s) 48 generated by sort logic controller 25 is, or are, multicast by the network to the actuators 55, 55', 55" which execute an appropriate response.

Actuators 55 preferably contact each unit of material 20 within a calculated area of accuracy 23. Because it is important that units of material 20 are diverted in an accurate manner, it is thus important that units of material 20 are consistently struck in an area of accuracy 23 of the unit of material 20, typically a center portion of unit of material 20. If actuators, collectively 55, contact units of material 20 improperly, such as along edges, units of material 20 may be improperly or incompletely diverted into divert lines 17, or may spin in place, resulting in jams and other problems. The accuracy of actuators 55 is mainly a function of the variable time factors in the time chain. Therefore, the timing requirements of the material sorting system according to this invention are very demanding due to the potential minimal size of unit of material 20 and the accuracy requirement for contact between actuator 55 and unit of material 20. Accuracy of the material sorting system according to this invention may be improved through the direct connection of length sensor 50 to one or more actuators 55.

Because segments 33 of transport media 30 are preferably each segmented in a logical manner, the actual speed of transport media 30 can be calculated by measuring the elapsed time from segment 33 to segment 33 using segment sensor 40. Segment sensor 40, through sort logic controller 25 or the network control layer 62, multicasts the passing of a change from segment 33 to segment 33 so that all actuators 55 receive notice of the change. Segment sensor 40 can multicast either the actual speed of the media, the time between segment 33 changes or the event of segment 33 change. It is preferable that such multicast has the highest network priority.

The execution of output signals from sort logic controller 25 should be synchronized using two different points. The reception of information at sort logic controller 25 regarding changes of segments 33 can trigger the execution of a control logic cycle. At the end of the control execution, sort logic controller 25 the network control layer 62 of the sensors 40, 45, 50 and actuators 55 that the outputs are ready to deliver and the output update multicast over the material sorting system starts immediately. The result of this synchronization between sort logic controller 25 and the network control layer 62 of the sensors 40, 45, 50 and actuators 55 results in time savings in the system chain and reduces the variable time in the material sortation system according to this invention. The synchronization can happen on the input side of sort logic controller 25 only or on the output side of sort logic controller 25 only or at both the input sides and the output sides of sort logic controller 25. Thus, according to the above description "synchronized logic solve and output delivery" will include calculating an output signal for actuators of the transport media in a calculation cycle of the sort logic controller; synchronizing the logic cycle of the network controller necessary for output of the output signal on the network with the calculation cycle of the sort logic controller whereby the output cycle of the network controller is triggered by the availability of the output signal from the sort logic controller. Thus, no time variables result from throughput of the output signal in the signal chain since calculation and delivery of the output signal are given the highest priority in normal operations.

In order to save time and reduce the variable time factor on the output updates, one single multicast output signal 48, including update information for all devices on the network or network nodes, such as one or more sensors 40, 45, 50 and/or actuators 55 may be sent. All actuators 55 pick up this message at the same time and can therefore react in a synchronized manner.

In a specific method for handling material at high speeds according to this invention, a plurality of units of material 20 are fed onto transport media 30 having a plurality of segments 33. An identification of each unit of material 20 is preferably sensed by identification sensor 45 and a corresponding identification signal is sent to sort logic controller 25. In addition, a length of each unit of material 20 is preferably sensed using length sensor 50 and a corresponding length signal is sent to either sort logic controller 25 or actuator 55. An interval length between units of material 20 and/or speed of transport media 30 is preferably sensed using segment sensor 40 and a corresponding interval signal is sent to sort logic controller 25. Finally, an output signal is multicast from sort logic controller 25 to at least one of the plurality of actuators 55. Units of material 20 are thereby sorted based upon the output signal. Preferably units of material 20 are sorted using a calculated activation point of each actuator 55. According to one preferred embodiment of this invention, the activation point may be calculated using an actual speed of transport media 30, an actual position of unit of material 20 and the length of unit of material 20.

While in the foregoing specification this invention has been described in relation to certain preferred embodiments thereof, and many details have been set forth for purpose of illustration, it will be apparent to those skilled in the art that the material sorting system is susceptible to additional embodiments and that certain of the details described herein can be varied considerably without departing from the basic principles of this invention.

I claim:

1. A method for sorting units of material from a transport media, the method comprising:

sensing at least one parameter of a unit of material to generate a data update;

sending the data update through a network to a sort logic controller, the sort logic controller and network having synchronized logic solve and output delivery;

the sort logic controller in communication through the network with sensors and actuators;

multicasting an output signal from the sort logic controller based upon the data update to a plurality of actuators; and sorting the units of material based upon the output signal.

2. The method of claim 1 wherein the at least one parameter of the unit of material is an interval length between a second unit of material.

3. The method of claim 1 wherein the at least one parameter of the unit of material is an identification of the unit of material.

4. The method of claim 1 further comprising:

dividing the transport media into a plurality of segments;

sensing the movement of the segments; and sending a movement signal representing location of the material through the sort logic controller.

5. The method of claim 1 further comprising moving a logical shift register forward one position when the transport media is advanced one segment in a plurality of segments.

6. The method of claim 1 further comprising operating the transport media at a constant speed.

7. The method of claim 1 further comprising spacing the units of material at predetermined intervals.

8. The method of claim 1 wherein the at least one parameter of the unit of material is a length of the unit of material.

9. The method of claim 8 further comprising:

calculating an activation point of the at least one actuator using an actual speed of the transport media, an actual position of the unit of material and the length of the unit of material.

10. The method of claim 9 wherein the actual speed of the transport media is calculated by sensing a transition between two segments of the transport media.

11. The method of claim 9 wherein the actuator contacts the unit of material within a calculated area of accuracy.

12. An apparatus for sorting units of material from a transport media using a network controller for of sensors and actuators of the transport media, the apparatus comprising:

at least one sensor sensing at least one parameter of a unit of material to generate a data update;

a sort logic controller having a synchronized logic solve and output delivery with the network controller, the network controller being in communication with the at least one sensor, the sort logic controller receiving the data update; and a plurality of actuators connected through the network controller with respect to the sort logic controller to receive a multicast output signal based upon the data update from the sort logic controller.

13. The apparatus of claim 12 wherein the at least one sensor comprises an identification sensor.

14. The apparatus of claim 12 wherein the at least one sensor comprises a segment sensor.

15. The apparatus of claim 12 wherein the transport media travels at a constant speed.

16. The apparatus of claim 12 further comprising a logical shift cation with the segment sensor.

17. The apparatus of claim 12 wherein the at least one actuator material within a calculated area of accuracy.

18. The apparatus of claim 12 further comprising the network to a bus connecting the sort logic controller with the plurality of actuators.

19. The apparatus of claim 12 wherein the at least one sensor comprises a length sensor.

20. The apparatus of claim 19 wherein the sort logic controller is additionally positioned in communication with the length sensor.

21. The apparatus of claim 19 wherein the at least one actuator is positioned in communication with the length sensor.

22. The apparatus of claim 12 wherein the transport media comprises a plurality of segments.

23. The apparatus of claim 22 wherein each segment of the transport media is the same length.

24. The apparatus of claim 22 wherein one unit of material is positioned on one segment of the transport media.

25. A method for sorting units of material comprising:

feeding a plurality of units of material to a transport media having a plurality of segments;

sensing at least one parameter comprising one of a length of a unit of material, an identification of the unit of material and an interval length between adjacent units of material;

sending a data update based upon the at least one parameter through a network control layer to a sort logic controller, calculating an output signal for control of the transport media with the sort logic controller, transferring the output signal to the network control layer;

immediately transferring the output signal from the network control layer to the actuators via a multicasting of the output signal; and sorting the units of material based upon the output signal.

26. The method of claim 25 further comprising:

dividing the transport media into a plurality of segments;

sensing the movement of the segments; and sending a movement signal through the sort logic controller.

27. The method of claim 25 further comprising:

moving a logical shift register forward one position when the transport media is advanced one segment in a plurality of segments.

28. The method of claim 25 further comprising:

calculating a plurality of output signals for control of the transport media with the sort logic controller, transferring the plurality of output signals to the network control layer at the same time;

immediately transferring the plurality of output signals from the network control layer to the actuators via a multicasting of the output signal; and sorting a plurality of units of material based upon the plurality of output signals.

29. The method of claim 25 further comprising:

calculating an activation point of the at least one actuator using an actual speed of the transport media, an actual position of the unit of material and the length of the unit of material.

30. The method of claim 29 wherein the actual speed of the transport media is calculated by sensing a transition between two segments of the transport media.

31. An apparatus for sorting units of material comprising:

a transport media formed in a plurality of segments, the transport media having a main sorting line and a plurality of divert lines;

at least one sensor positioned with respect to the main sorting line sensing at least one parameter of a unit of material to generate a data update;

a sort logic controller having synchronized logic solve and output delivery with a network, the sort logic controller being in communication through the network, with the at least one sensor for receiving the data update; and a plurality of actuators positioned with respect to an intersection between the main sorting line and a divert line of the plurality of divert lines, the plurality of actuators in communication with the sort logic controller to receive a multicast output signal based upon the data update from the sort logic controller.

32. The apparatus of claim 31 wherein a bus connects the sort logic controller to the at least one actuator.

33. The apparatus of claim 31 wherein at least one segment sensor is positioned with respect to the main sorting line in communication with the sort logic controller.

34. The apparatus of claim 31 wherein one unit of material is positioned on one segment of the transport media.

35. The apparatus of claim 31 further comprising a logical shift register in communication with the segment sensor.

* * * * *